(12) United States Patent
Little et al.

(10) Patent No.: US 9,449,044 B1
(45) Date of Patent: *Sep. 20, 2016

(54) MISTAKE AVOIDANCE AND CORRECTION SUGGESTIONS

(71) Applicant: The MathWorks, Inc., Natick, MA (US)

(72) Inventors: John N. Little, Sherborn, MA (US); Jason Breslau, Holliston, MA (US); Nausheen Moulana, Southboro, MA (US); Vadim Teverovsky, Acton, MA (US); Bryan White, Holliston, MA (US); Joseph F. Hicklin, Upton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,381

(22) Filed: Feb. 13, 2015

Related U.S. Application Data

(63) Continuation of application No. 13/616,997, filed on Sep. 14, 2012, now Pat. No. 9,081,761, which is a continuation-in-part of application No. 13/074,717, filed on Mar. 29, 2011, now Pat. No. 8,346,793.

(60) Provisional application No. 61/378,550, filed on Aug. 31, 2010.

(51) Int. Cl.
*G06F 17/27* (2006.01)
*G06F 17/30* (2006.01)

(52) U.S. Cl.
CPC ... *G06F 17/30401* (2013.01); *G06F 17/30522* (2013.01)

(58) Field of Classification Search
USPC ...... 707/722, 758, 759, 769; 704/8; 715/773
See application file for complete search history.

(56) References Cited

U.S. PATENT DOCUMENTS

| 4,914,590 A | 4/1990 | Loatman et al. |
| 5,572,423 A | 11/1996 | Church |

(Continued)

OTHER PUBLICATIONS

Google, Google Suggest: Features—Web Search Help, available at http://www.google.com/support/websearch/bin/answer.py?hl=en-GB&answer=106230 (accessed Apr. 29, 2011).

(Continued)

*Primary Examiner* — Hung T Vy
(74) *Attorney, Agent, or Firm* — Venable LLP; Michael A. Sartori

(57) ABSTRACT

In an illustrative embodiment, an apparatus, computer-readable medium, or method may be configured to avoid command mistakes and suggest corrections. Known commands may be accessed which may include at least one expected identifier, alternative identifier, and/or identifier pattern. The frequencies of occurrence of the known commands may be calculated. A command with entered identifiers may be received and at least one possible mistake in the entered identifiers may be detected. A first numerical score for the known commands may be calculated using a string matching algorithm, a keystroke penalty matrix, and/or the detected at least one possible mistake. A second numerical score may be calculated using the frequencies of occurrence of the known commands and the first numerical score. Expected identifiers may be selected using the first and second numerical scores. A user-selectable command may be created using the expected known commands and displayed.

24 Claims, 11 Drawing Sheets

(56) References Cited

U.S. PATENT DOCUMENTS

| | | | |
|---|---|---|---|
| 5,940,847 A * | 8/1999 | Fein | G06F 17/21 715/236 |
| 6,848,080 B1 * | 1/2005 | Lee | G06F 17/2223 704/9 |
| 7,880,730 B2 | 2/2011 | Robinson et al. | |
| 7,920,132 B2 | 4/2011 | Longe et al. | |
| 8,346,793 B1 | 1/2013 | Hicklin et al. | |
| 2006/0293889 A1 * | 12/2006 | Kiss | G10L 15/22 704/235 |
| 2007/0027858 A1 | 2/2007 | Weinberg et al. | |
| 2007/0040813 A1 * | 2/2007 | Kushler | G06F 3/0237 345/173 |
| 2008/0266261 A1 | 10/2008 | Idzik | |
| 2008/0306895 A1 | 12/2008 | Karty | |
| 2009/0199090 A1 | 8/2009 | Poston et al. | |
| 2009/0284471 A1 * | 11/2009 | Longe | G06F 3/0237 345/168 |
| 2010/0257478 A1 | 10/2010 | Longe et al. | |

OTHER PUBLICATIONS

Leaning the Bash Shell, 3rd edition, available at http://proquest.safaribooksonline.com/print?xmlid=0596009658/bash3-app-d (accessed Sep. 1, 2009).

Wikipedia, Command Line Completion, available at http://en.wikipedia.org/wiki/Command_line_completion (accessed Mar. 2, 2008).

Auto Completion, available at http://codebot.org/delphi/?doc=9451 (accessed Mar. 2, 2008).

* cited by examiner

400

|  | Q | w | W | e | E | ... |
|---|---|---|---|---|---|---|
| Q | 0 | 3 | 2 | 5 | 4 | |
| w | 3 | 0 | 1 | 2 | 3 | |
| W | 2 | 1 | 0 | 3 | 2 | |
| e | 5 | 2 | 3 | 0 | 1 | |
| E | 4 | 3 | 2 | 1 | 0 | |
| ... | | | | | | |

Entered Value 410

Meant to Type 420

```
function [score,match]= bestErrorMatch(typedString)
% Find the best legal string when the user mis-types
    persistent pWords allWords M gapOpen gapExtend
    if(isempty(pWords))
% legal matlab commands and their frequency
        Str = load('priors/priors.mat');
        pWords = Str.pWords;
        allWords = Str.allWords;
% Only repair to the most common N commands
% N = 4000;
% [~,i] = sort(pWords,'descend');
% pWords = pWords(i(1:N));
% allWords = allWords(i(1:N));
% a score matrix for matching mis-typed commands
        match      = log10(0.969);
        caseMiss   = log10(0.010);
        close      = log10(0.010/6);
% because there are six close misses
        miss       = log10(0.001/120);
% because there are 128 - 8 misses
        gapOpen    = log10(0.005);
        gapExtend  = log10(0.005);
        M = keyboardDistance([match, caseMiss,close,miss]);
    end
% All of the variables in the workspace are legal strings
to type
    w = evalin('base','whos');
    workspaceVars = {w.name};
% Assume they are equally likely
    n = length(workspaceVars);
    pWorkspaceVars = ones(1,n)/n;
% All of the functions in the current directory are legit
as well
    w = what;
    localFiles = [w.m;w.mex]';
    localFiles = regexprep(localFiles, '\..+','');
% strip suffix
% Also equally likely
    n = length(localFiles);.
    pLocalFiles = ones(1,n)/n;
```

FIG. 8A

```
% group all the sources
    candidates = [workspaceVars,localFiles,allWords];       820
    pCandidates =
[pWorkspaceVars/3,pLocalFiles/3,pWords/3];
% calculate p(Ty | Mx) for each x
    scores = zeros(size(candidates));
    for i = 1:length(candidates)                    ← 850
        candidate = candidates{i};
        thisScore = affinegapmex(uint8 (typedString),
uint8(candidate), gapOpen, gapExtend, M, 1);
% thisScore = simplegapmex (uint8(typedString),
uint8(candidate), gapOpen, M, 1);
        scores(i) = 10^thisScore;
% here we exponentiate so letter scores are multiplied not
added
    end % use Bayes theorem to combine score and prior
    pGuess = scores .* pCandidates / sum(scores .*
pCandidates);

% and the winner is...
    [score,i] = max(pGuess);
    match = candidates{i};
%% Some diagnostic output
%bar(scores)
    if(true)
        [yScore,iScore] = sort(pGuess, 'descend');
        fprintf('\n');
        for i = 1:1000
            if(yScore(i) < yScore(1)/1000000)
                break;
            end
            index = iScore(i);
            fprintf('%8s   %g %g %g\n', candidates{index},
yScore(i),scores(index),pCandidates(index));
        end
        fprintf('\n');
    end
```

FIG. 8B

MISTAKE AVOIDANCE AND CORRECTION SUGGESTIONS

RELATED APPLICATIONS

This patent application is a continuation of U.S. patent application Ser. No. 13/616,997, filed Sep. 14, 2012, which is a continuation-in-part of U.S. patent application Ser. No. 13/074,717 filed on Mar. 29, 2011, which claims the benefit of U.S. Provisional Patent Application No. 61/378,550, filed Aug. 31, 2010. Each of the above-identified applications is hereby incorporated by reference in their entirety.

BACKGROUND SECTION

Some computing systems may provide users with assistance while the user interacts with the computer. For example, some systems may provide spell checkers or auto completion functions for use with search applications.

Spell checkers may work by comparing a series of characters against each word in a dictionary (i.e., a list of correctly spelled words). Word processing applications, such as Microsoft® Word, may contain spell checking functionality that may identify a possibly misspelled word and may suggest possible correct spellings. Microsoft® Word also contains grammar checking functionality that may identify and alert users to potential grammatical errors.

Google Suggest™, on the other hand, may provide a listing of possible search queries while a user is typing based on other search queries. One or more algorithms based on factors, such as the popularity of a particular search, may be used to populate the suggested search list. Additionally, Google Suggest™ may provide search alternatives if the search terms are potentially misspelled.

The Apple® iOS operating system may provide an auto-correct feature that automatically replaces potentially misspelled words to known alternatives. As a user types, the iOS operating system may automatically correct and replace the user's entries with known alternatives.

BRIEF DESCRIPTION OF THE DRAWINGS

The accompanying drawings, which are incorporated in and constitute a part of this specification, illustrate one or more embodiments of the invention and, together with the description, explain one or more illustrative embodiments of the invention. In the drawings.

FIGS. 8A and 8B illustrate example software code that may implement an illustrative embodiment of the invention;

DETAILED DESCRIPTION

Overview

Figures 1A, 1B:
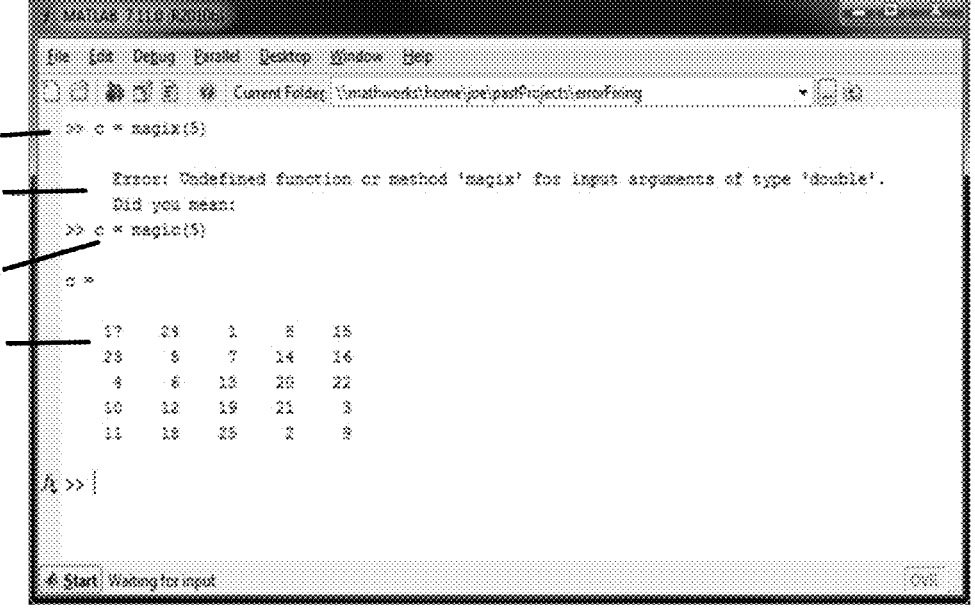
FIGS. 1A and 1B illustrate example screen-shots of command-line interfaces configured to practice an illustrative embodiment.

Information processing systems, such as text-based programming environments, may allow for the input of textual data. The inputted textual data may be transformed by the information processing system into another form of information (e.g., but not limited to, statistics, graphs, tables, graphics, etc.). Inputted textual data may include a finite number of identifiers which may be interpreted by the processing system. Identifiers may include, for example, global identifiers, global variables, global functions, global methods, global keywords, special characters, global commands, workspace variables, local commands, local keywords, operators, local functions, local scripts, local variables, local methods, argument names, tokens stored in files, keywords, parameter names, enumerated values, properties, properties of an object, methods of an object, features, other lexical tokens recognized by the information processing system, etc. For the information processing system to correctly interpret the identifier, the identifier may be required to contain the correct characters in the correct sequence. Additionally, information processing systems may be case sensitive. As such, the identifier may need to be in the correct type case. For example, if the identifier is misspelled or otherwise entered incorrectly the information processing system may not be able to correctly interpret the identifier.

Users, especially novice users, may inadvertently enter identifiers incorrectly into the information processing system. Information processing systems may detect the incorrect identifier and request correction. However, information processing systems may not offer the user an accurate list of possible correct identifiers. Also, identifiers may be used that are syntactically correct but not what the user intended or contextually incorrect.

An example embodiment may assist in the selection of correct identifiers and may avoid mistakes by displaying one or more possible identifiers after identifying an incorrect identifier or possible user mistake. This illustrative embodiment may use one or more algorithms to determine the one or more possible or alternative identifiers to display. In this illustrative embodiment, prior statistics such as the frequency of use for each expected identifier may be created. The statistics may be calculated using gathered data from, for example, the user environment, context, synonyms, multiple natural languages (e.g., English, French, Spanish, Korean, Japanese, Chinese, Arabic, Farsi, etc.), unlicensed products, prior releases, other programing languages (e.g., C/C++, Java, MATLAB® programming language by The MathWorks, Inc., etc.), etc.

In one embodiment, identifiers that do not appear in gathered data may be assumed to be infrequently used and may be assigned a low probability of user intent. A string matching algorithm may be utilized which may compare the entered string with known identifiers and/or known commands. Then, based on statistics, such as, the frequency of use and the result from the string matching algorithm, another algorithm may compute a set of potential matches. These potential matches may be displayed to the user as possible alternatives to the possible user mistake (e.g., mistyped identifier, unrecognized identifier, contextual error, etc.).

In an example embodiment, suggested alternatives for an unknown identifier may come from one or more of, for example, syntax, context, synonyms, user environment, prior releases, unlicensed products, locale information, etc.

Corrections may include suggestions for one or more, for example, detected errors or mistakes in command and function calls, indexing, punctuation, property names, shape and type of arguments, misused synonyms, foreign languages, operators and keywords from other computer languages, deprecated functions, context sensitive typographical errors, unlicensed products, scope, user environment changes, etc.

In some cases, the command, code, or program may be syntactically correct but, nonetheless, may not be semantically and/or contextually correct and may not execute as the user intended. In such a case, suggestions may be provided to the user to enable the program to be written as the user may have intended.

In some cases, when an error or possible error is detected, a suggestion or suggestions may be provided to the user. The user may then be required to accept the suggestion, refuse the suggestion, modify the suggestion, or supply a different identifier. However, if the probability that the unknown identifier is a match crosses a given threshold (e.g., a 99% certainty that the user intended the found identifier) or if a previous configuration indication is given by the user (e.g., the user selects the option to autocorrect), the suggestion may be implemented in the program without user intervention.

Catching command function duality mistakes may involve identifying when the user meant to pass a reference by value instead of as a string literal. In some interpretive languages, several ways may exist for calling functions, for example, using either command syntax or function syntax (i.e., command function duality). A function call in command syntax may be of the form function name arg1 arg2 . . . argn. While in function syntax, the same function call may be of the form function name (arg1, arg2, . . . argn). When calling a function in command syntax, the arguments may be passed as string literals. However, when calling a function in function syntax, the arguments may be passed by value. Accordingly, situations may occur when the user is calling a function and passing a string literal (e.g., using command syntax) when the user would expect to be passing the value.

For example, when using mathematical functions a user might rarely expect the ASCII string value of a number to be passed to the function. For example, if the user typed the command "SUM 42," the system may suggest using "SUM (42)" instead. Command line and function call issues may not be system errors (i.e., the command will be accepted by a command interpreter); however, there may be a high likelihood that the user meant something other than the entered text. Accordingly, a suggestion may be made to use the function syntax, for example.

Catching indexing mistakes may involve, for example, identifying misnumbering of an index in a multidimensional array. In some computer languages, indexing a matrix may use two subscripts representing the rows and columns (e.g., where M is a matrix, M(2,3), retrieves the value at the second row, third column). Some computer languages support linear indexing, where the matrix is treated as one long column of values. Accordingly, when a single subscript is supplied (e.g., M(16)), the system may return the element corresponding to the requested element (e.g., the sixteenth element from the one long column of values). However, often users may not want to use linear indexing and instead may want to request row and column indicators. Thus, when a single argument is supplied, a suggestion may be made to use a multiarray value or special characters such as ":" (e.g., M(16, :).

Catching punctuation errors may involve, for example, identifying the misuse of special characters and providing suggested alternatives. For example, suggesting using "}" when ")" was supplied.

Context based corrections and/or suggestions may be based on, for example, known properties or methods. An object, for example, may have defined properties or methods. When an error such as an unknown property or method occurs when processing an object, a suggestion to the user may be made based on the defined or known properties or methods. Accordingly, typographical errors when using defined properties or methods may be corrected based on what may be expected when using that object.

In addition to finding unknown properties due to known classes, suggestions to the user may also be made based on classes limited to those which have a specified property. For example, if a typographical error is in a classname, the list of possible classes may be limited to those which have the specified property. For example, given class "Square" with a property "Length" if "Square.Lengty" is supplied (e.g., typed in by a user) matches may be made against the properties of Square and Length may be found for Lengty. However, if "Sqiare.Length" is supplied, "Sqiare" may be identified as unknown and the list of possible suggestions may be limited to classes which have a property "Length." Furthermore, "Sqiare.Lengty" may be matched by combining both rules for matching classnames and properties. Additionally, properties and methods of a class are one of many instances in which a dot represents a name within the scope of another name. Classes inside packages, packages inside packages, functions inside packages, fields inside structs, etc. are other examples to which these rules may also apply.

A context mistake may occur, for example, when the user enters one or more identifiers incorrectly based on the shape and type of arguments used, uses deprecated or outdated features or features that are no longer available due to release incompatibilities, or attempts to access unlicensed features.

Context based corrections and/or suggestions may be based on the shape and type of arguments used. If, for example, an incorrect argument type was used, suggestions may be based on similarly named and correctly typed alternative arguments. A class or an object, for example, may change between when access to the class was written in code (e.g., write time) and then during code execution (e.g., runtime). Accordingly, for example, if an error occurs where the runtime object is different from the write time implementation, a suggestion to the user may be based on the changes made to the class or object.

Context based corrections and/or suggestions may be based on deprecated or outdated features or features that are no longer available due to release incompatibilities. When new versions of software are released, features from prior versions may become deprecated, superseded, or removed from newer versions. Accordingly, if, for example, executed code is using outdated features, corrected code (e.g., code using features from the updated release) may be suggested to the user. Such a suggestion may be in the form of a command that contains replacement identifiers, for example.

Suggestions may also come from known products that are not currently licensed by the user. Occasionally, users may reference features that are not available from their currently purchased products (e.g., unlicensed products). If a feature is identified as being from an unlicensed product, a suggestion may be made to encourage purchase of the unlicensed product and/or instructions on how to use alternative, currently purchased, features may be supplied.

Corrections and/or suggestions may also be based on misused synonyms received via an input device. When attempting to reference features, users may accidentally use a synonym when referring to that feature. For example, users may reference "graph" when they intended to reference "plot." Accordingly, when a user supplies "graph," a suggestion to use "plot" may be presented to the user. A list of synonyms may be referenced to assist in detecting accidental synonym usage. The list may be updated automatically and/or may be maintained (e.g., edited) by the user.

Similar to suggestions based on misused synonyms, suggestions may also be based on alternative natural languages (e.g., English, French, Spanish, German, Russian, Arabic, Chinese, etc.). For example, if a user references the French "qui," the English "who" may be suggested. Translations may be matched based on the locale indicated by a computer system (e.g., Mac 0/S or Windows O/S) or by the user. Alternatively, a known list of natural language translations for many languages may be supplied. A list for multiple natural language translations and/or single language translations may be updated automatically and/or may be maintained (e.g., edited) by the user. Accordingly, the user suggestion may contain, for example, replacement identifiers, where the replacement identifiers contain the English language version of the user entered command.

Similar to misused synonyms, corrections and/or suggestions may be based on shortened commands (e.g., abbreviated, contracted, abridged, truncated, an acronym, commonly used form, etc.). In some cases a user may supply a short name when the user intended to reference a long name. For example, if a user supplies "eig," the long name "eigenvalue" may be suggested, or if the user supplies "sin," the long name "sine" may be suggested. A list may be maintained that aligns the shortened command with the correct identifier. The list may be updated automatically and/or may be maintained (e.g., edited) by the user. Accordingly, the replacement identifiers may contain the long version of the entered command. Additionally, the abbreviations may go both ways, as the correct function name may be abbreviated. If, for example, the user specifies a full name and the correct function is an abbreviation, the abbreviation may be suggested.

Similar to corrections and/or suggestions based on natural languages, suggestions may also be based on alternative computer languages. Users familiar with other computer languages may be inclined to use the same operators and keywords from other computer languages. For example, if a user using a language, such as the MATLAB® programming language, supplies the commands "a+=2," "a++," ""foo,"" or "!a," the following alternatives may be suggested "a=a+2," "a=a+1," ""foo,"" or "~a," respectively. Using syntax that is not supported by the programming language will result in a syntax error and may cause unpredictable results. Accordingly, alternative syntax suggestions may be supplied when incorrect syntax, common with other computer languages, is provided by a user. Computer languages may include, for example, one or more of MATLAB®, M, an array-based language, Mathematica, Python, R, C, C++, Java, Fortran, Pascal, Basic, Ada, ML, JavaScript, HTML, XML, Perl, SQL, C#, etc. Accordingly, the replacement identifiers may contain a proposed correct syntax for the user entered command.

Typographical errors may also be detected based on the context of when and where the error occurred. Given a particular context, particular suggestion(s) may be supplied based on that context. Given contexts may include one or more of, for example, object properties and object methods, parameter names, enumerated values, etc. Thus, when a particular object is given, the object's properties and methods are known and may be used to determine the suggestions.

For example, given a currentDate object, with year, day, and month properties, if "currentDate.Yesr" was entered, "currentDate.Year" may be suggested. Similarly, given a block of code (e.g., function, sub-routine, etc.) with a defined parameter, the parameter may be given as a suggested alternative to a closely matched unknown identifier. For example, if the defined parameter is "numberOfCoins" and the unknown identifier is "numberfCoins," the defined parameter "numberOfCoins" may be given as a suggestion. Suggestions may also be given in the context of enumerated values. For example, if "color.Bluw" is given, "color.Blue" may be suggested. Such name value pairing provides the context to suggest valid identifiers and may be used to increase the likelihood percentage of a match.

Additionally, some properties, methods, enumerated values, etc. may be unknown to the user when writing the code (e.g., at write time) and may be left blank or filled with temporary place holders. During runtime or compile time, the blank values or temporary place holders may require valid identifiers and the user may be given a list of possible suggestions based on the context and known values at runtime.

Correction and/or suggestion information may also be obtained from the user environment. Suggestions may be generated based on user history, such as one or more of frequently used features, the changing of scope, locale information, previously accepted suggestions, etc.

Different users may use different identifiers at varying rates. Identifiers that have been used often may be more likely to be used again by that same user. Accordingly, identifiers that are used often may have a higher probability of being suggested to the user. For example, if a particular function call is used often, then the probability increases that the user will intend to use that function call and, therefore, a suggestion is more likely to include that often used function call. Knowledge of how often particular features are used may be generated as the user enters information (e.g., types on the keyboard, uses the mouse, etc.) and/or may be generated through analyzing logs.

In addition to identifying usage patterns for a specific user, the patterns may be used to match a user against a profile of users. For example, a user could frequently be using "plot" and "line," which may match the user against other profiles of users which use "plot" and "line." Then, frequently used functions from those other profiles, which may have never been used by the user, may also have an increased likelihood. This information may also be presented in tips. An example tip, may include "Other users who used the functions you are using also like to use functions X, Y, and Z."

Occasionally programming language features that were available in one session may become out of scope in another session. Corrections and/or suggestions may be based on identifiers that were previously available and are now out of scope. Programming languages may use variables such as the current directory or directory path to find features (e.g., identifiers, classes, functions, etc.). If, for example, the current directory or local path is changed, programming language features may go out of scope and previously valid features may become out of scope. Suggestions may be given based on the previously valid features with a description of where the feature went, how the user may be able to correct the problem, and/or the past usage of the directory paths, for example.

A keyboard penalty matrix may be used to determine the probability that the user intended to use a known identifier. The keyboard penalty matrix may be configured based on the user locale information and/or keyboard selection (e.g., QWERTY keyboard, Dvorak keyboard, Arabic keyboard, etc.).

Suggestions and/or corrections may also be based on past history of which suggestions were presented, which suggestions were selected, which sections were not selected, and/or which selections were modified. The logic that supplies the suggestions may adapt and learn based on usage history. The suggestions that are supplied to the user may be influenced based on prior usage or usage patterns. Furthermore, suggestions for specific mistakes and the user response (e.g., accepted, rejected, or edited) may be stored and, if the same mistake occurs again, the suggestion to the user may be influenced based on the user's prior responses. For example, if a particular suggestion is often accepted (e.g., been accepted for the past five times), the suggestion may have an increased chance in being presented as a suggestion in the future when the same error occurs. Or, for example, if a particular suggestion is often rejected by a user (e.g., not accepted for the past five times when suggested), the suggestion may have a decreased chance of being presented as a suggestion in the future when the same error occurs. Additionally, if a suggestion is consistently modified (e.g., the suggestion is not accepted but a variant of the suggestion is accepted), the modification may be aligned with the error causing the suggestion and the modification may then be suggested in the future when the same error occurs.

Accordingly, adaptations based on historical use may take several different forms. For example, probabilities may be updated to reflect usage or usage patterns. In another example, responses (e.g., accepted, rejected or edited) to suggestions for specific unknown identifiers or mistakes may be stored; the stored information based on the response may then be applied to future suggestions if the same unknown identifier or mistake is again inputted.

Illustrative Examples

FIGS. 1A and 1B illustrate example screen-shots of command-line interfaces 100 and 140 configured to practice an illustrative embodiment.

The example screen-shot of command-line interface 100 depicts user-entered string "c=magix(5)" 110 entered into the command-line interface 100. In this illustrative embodiment, the information processing system may recognize "magix" in the user-entered string 110 as an unrecognized identifier and displays error message 120. The system may evaluate the probability of all the possible alternatives and display the alternative with the highest probability of being the correct identifier. Here, in this example, "magic" replaces "magix" and displays "c=magic(5)" as the suggested identifier 125. In this illustrative embodiment, suggested identifier 125 was selected, and the program continued with matrix 130.

The example screen-shot of command-line interface 140 depicts user-entered string "ploy(1:10)" 150 as being entered into the command-line interface 140. In this illustrative embodiment, the information processing system may recognize "ploy" in the user-entered string 150 as an unrecognized identifier and may display error message 160.

The system may evaluate the probability of all the possible alternatives and may display the suggested identifier with the highest probability of being the correct identifier. Here, in this example, "plot," a built-in function name, replaces "ploy" and "plot(1:10)" is displayed as user-selectable option 170. In another embodiment, multiple suggested identifiers may be displayed, and these multiple suggested identifiers may be ranked according to their probabilities. User-selectable option 170 may be selected by, for example, using a mouse, other pointing device, or a keyboard. Concurrently or after selection of user-selectable option 170, the suggested identifier may be executed. An embodiment may allow a suggested identifier to be modified before execution to further correct the user-entered string. For example, user modified command 180, where the user added "magix," may be executed. Alternatively, a user may choose not to select the user-selectable option 180 and may enter a different command into command-line interface 140. Here, the user modified command 180 may also contain an unrecognized identifier and error message 190 may display. Again, the system may have evaluated the probability of all the possible alternatives and may display the suggested identifier or identifiers with the highest probability of being the correct identifier. Here, in this example, "magic" replaces "magix" and displays "plot(magic(1:10))" as user-selectable option 195. In this example, the system detected an unknown identifier when it expected a variable of type double.

Figure 2A:
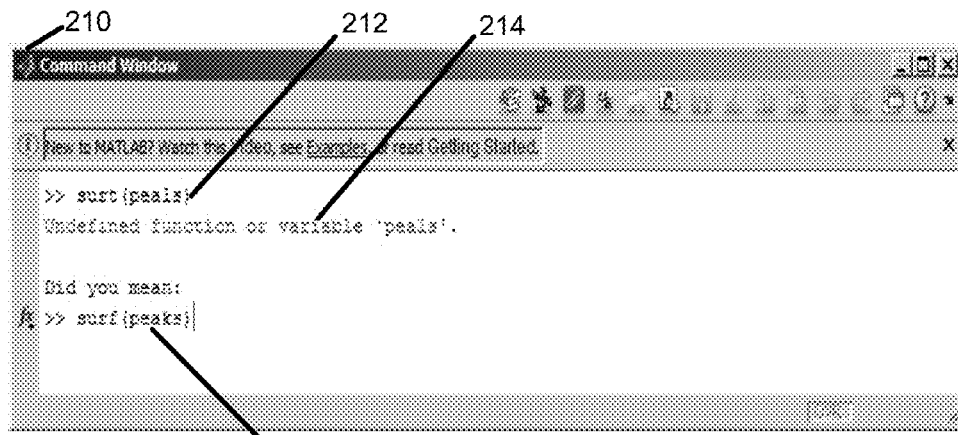
FIGS. 2A, 2B, and 2C illustrate additional example screen-shots of command-line interfaces configured to practice an illustrative embodiment.
Figure 2B:
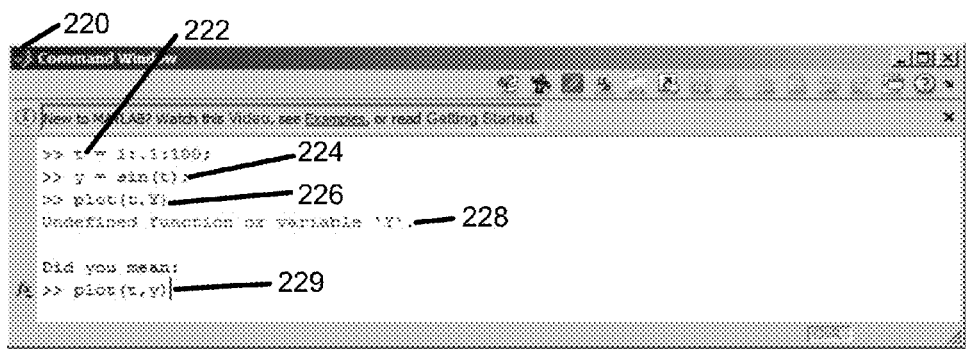
Figure 2C:
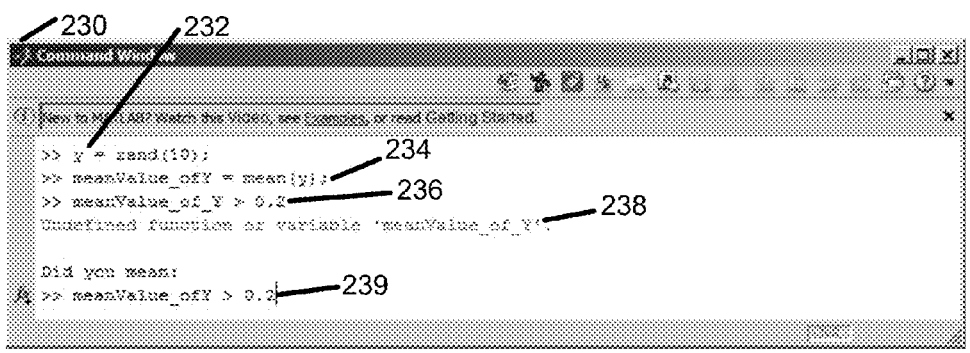

FIGS. 2A, 2B, and 2C illustrate additional example screen-shots of command-line interfaces 210, 220, and 230 configured to practice an illustrative embodiment.

The example screen-shot of command-line interface 210 depicts user-entered string "surt(peals)" 212 entered into the command-line interface 210. In this illustrative embodiment, the information processing system may detect both "surt" and "peals" in user-entered string 212 as unrecognized identifiers and may display an error message 214.

The system may evaluate the probability of all the possible alternatives and may display the suggested identifiers with the highest probability of being the correct identifiers. In this example, "surt" and "peals" may be replaced with "surf" and "peaks" respectively, and may be displayed as user-selectable option 216. In this example, the system corrected multiple typographical errors in the same statement.

The example screen-shot of command-line interface 220 depicts user-entered commands 222, 224, and 226. In user-entered command 222, the variable "t" is set equal to "1:0.1:100." In user-entered command 224, the variable "y" is set equal to "sin(t)." User-entered command 226 uses variable "t" and the incorrect case of variable "y" as "plot(t, Y)." In this illustrative embodiment, the information processing system may detect "Y" as an unrecognized identifier and may display error message 228.

The system may evaluate the probability of all the possible alternatives and may display the suggested identifiers with the highest probability of being the correct identifiers. In this example, "Y" may be replaced with "y," and may be displayed as user-selectable option 229. In this example, the system corrected the variable with the incorrect case.

The example screen-shot of command-line interface 230 depicts user-entered commands 232, 234, and 236. In user-entered command 232, the variable "y" is set equal to "rand(10)." In user-entered command 234, the variable "meanValue_ofY" is set equal to "mean(y)." User-entered command 236, is shown as "meanValue_of_Y>0.2." In this illustrative embodiment, the information processing system may identify "meanValue_of_Y" as an unrecognized identifier and may display error message 238.

The system may evaluate the probability of all the possible alternatives and may display the suggested command with the highest probability of being correct. In this example, "meanValue_of_Y" may be replaced with the previously defined "meanValue_ofY," and may be displayed as user-selectable option 239. In this example, the system suggested a correction for the mistyped variable name.

Other illustrative embodiments of the invention may include alternative ways of displaying and selecting suggested identifiers. Such selections may include, for example, a list box, drop-down list, pop-up menu, context menu, combo-box, or other text and/or graphical selection techniques.

Additionally, in an illustrative embodiment, identifiers may be verified as they are being supplied. For example, partial recognition may occur as an identifier is being entered. Also, the user may request the system to detect the entered identifiers and suggest possible expected identifiers. For example, a user may enter "plo" and press the tab key, requesting the system to examine "plo." The system may detect that "plo" is an unrecognized identifier and suggest "plot" which the user may accept and/or modify.

In an illustrative embodiment, identifier verification may also occur after the command is executed (e.g., after the "Enter" key is pushed). If the user identifier is unrecognized, the user may be prompted with suggested identifiers.

Example System

Figure 3:
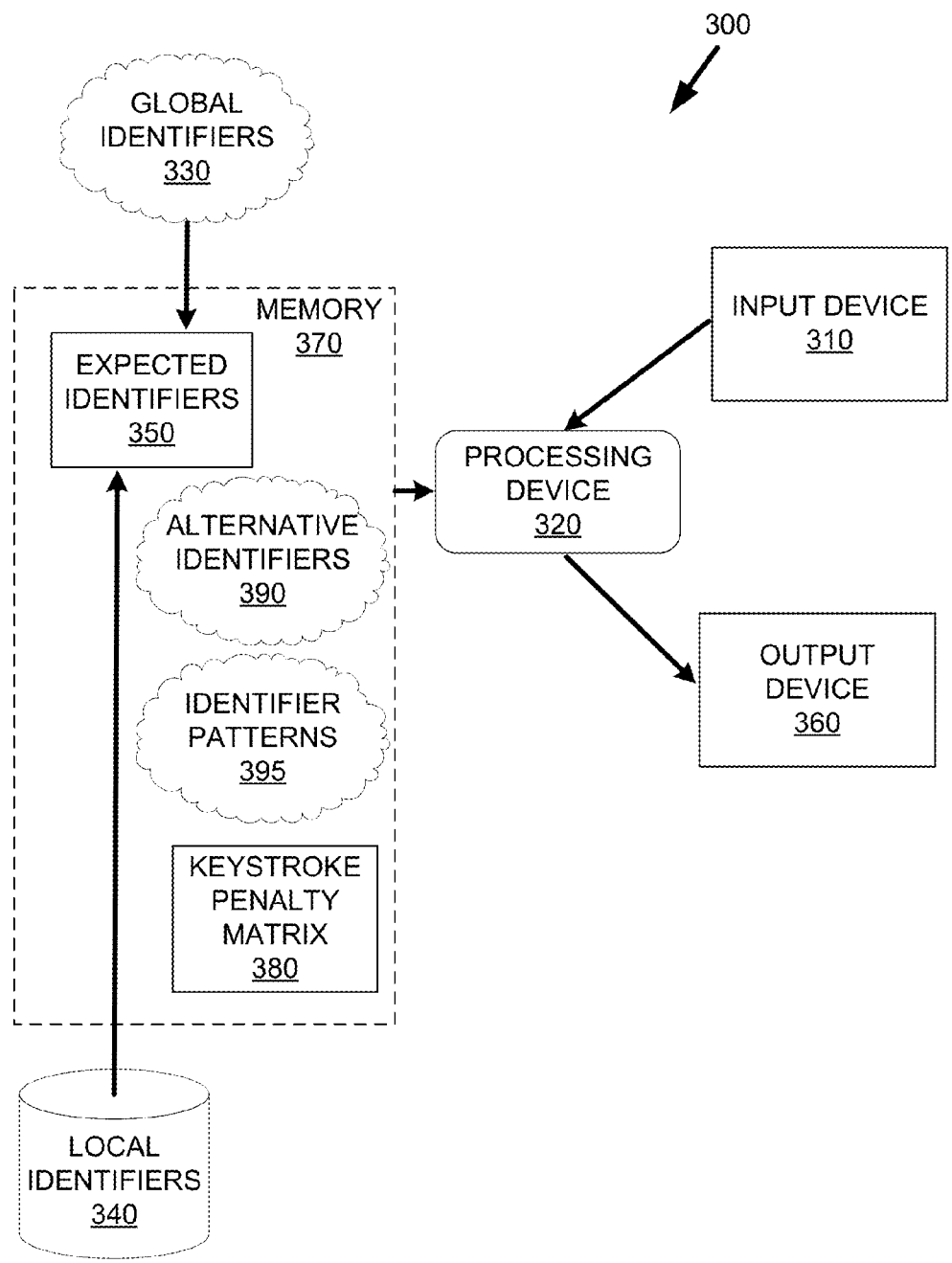
FIG. 3 illustrates an example processing system configured to practice an illustrative embodiment.

FIG. 3 illustrates an example processing system 300 configured to practice an illustrative embodiment. In the illustrative embodiment of FIG. 3, system 300 may include devices such as, for example, input device 310, processing device 320, output device 360, and memory 370. System 300 may also include various data, including, for example, global identifiers 330, local identifiers 340, expected identifiers 350, keystroke penalty matrix 380, alternative identifiers 390, and identifier patterns 395.

Input device 310 may include a device for providing inputs to processing device 320. For example, input device may receive input from a user or another device. Input device 310 may include, for example, a keyboard, track ball, touch sensitive display, haptic device, microphone, etc.

Processing device 320 may include hardware configured to execute computer-executable instructions that implement illustrative embodiments. The instructions may reside in memory 370. Examples of processing devices that may be used includes the 3$^{rd}$ Generation Intel® Core™ i7 processor available from Intel Corporation, Santa, Clara, Calif., field programmable gate arrays (FPGA's), graphics processing units (GPUs), application specific integrated circuits (ASICs), etc.

Global identifiers 330 may include identifiers such as, but not limited to, global variables, functions, methods, identifier synonyms, identifier natural language translations, prior release identifiers, identifiers from unlicensed products, other programming language identifiers, abbreviated identifiers, short version of identifiers and/or keywords used in a particular product line or lines (e.g., but not limited to, MATLAB®). Global identifiers 330 may be stored in memory 370 or other local storage, or global identifiers 330 may be stored in a location remote (e.g., a cloud) from processing system 300.

Local identifiers 340 may include identifiers such as, but not limited to, local variables, user-defined variables, workspace variables, function names, method names, argument names, operating system values, and/or file defined tokens, variables, scripts, methods and/or functions. User-defined variables may be identified in whatever manner processing system 300 allows users to define identifiers (e.g., but not limited to, a user-defined path to files where the names of the files become identifiers). Local identifiers 340 may be stored in memory 370 or other local storage, or local identifiers 340 may be stored in a location remote (e.g., a cloud) from processing system 300.

Expected identifiers 350 may include both global identifiers 330 and local identifiers 340. Identifiers in expected identifiers 350 may be associated with a frequency of occurrence. For example, commonly used commands (e.g., "cd") are used often and, therefore, may have a higher frequency of occurrence. A higher frequency of occurrence may also be assigned based on the context of the unknown identifier. The combination of expected identifiers 350 and associated frequency of occurrences may be called a prior probability distribution or as may be colloquially called by mathematicians "the prior."

Output device 360 may include a device for providing outputs from processing device 320. Output device 360 may include, for example, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Memory 370 may be a computer-readable medium that may be configured to store instructions configured to implement illustrative embodiments of the invention. Memory 370 may be a primary storage accessible to processing device 320 and may include a random-access memory (RAM) that may include RAM devices, such as, for example, Dynamic RAM (DRAM) devices, flash memory devices, Static RAM (SRAM) devices, etc. Memory 370 may store global identifiers 330, local identifiers 340, expected identifiers 350, keystroke penalty matrix 380, alternative identifiers 390, and identifier patterns 395.

Keystroke penalty matrix 380 may include a matrix (e.g., 128 by 128) of values. Each value may represent a mistyping penalty. Keystroke penalty matrix 380 is further described with respect to FIG. 7 below.

Alternative identifiers 390 may be processed similarly to expected identifiers 350. Alternative identifiers 390 may include one or more, for example, synonyms of expected identifiers, language translations of expected identifiers, recently modified identifiers, alternative names of expected identifiers, unlicensed features, recently used identifiers, release incompatible identifiers, deprecated identifiers, special characters, property names, locale information, enumerated values, object properties, object methods, information from user logs, etc.

Identifier patterns 395 may be processed similarly to expected identifiers 350. Identifier patterns 395 may include one or more of, for example, programming language grammar, programming language syntax, programming language operators, programming language keywords, programing language punctuation, alternative programming language grammar, alternative programming language syntax, alternative programming language operators, alternative programming language keywords, alternative programming language punctuation, etc.

In operation, input device 310 may allow input of identifiers and may forward the entered identifiers to processing device 320. Processing device 320 may interpret the identifiers and detect entered identifiers that do not match the expected identifiers 350, alternative identifiers 390, identifier patterns 395, and/or whose context appears to be incorrect. When processing device 320 detects an unrecognized identifier, processing device 320 may, for expected identifiers 350, use a string matching algorithm (e.g., but not limited to, Needleman-Wunsch algorithm or Smith-Waterman algorithm) combined with keystroke penalty matrix 380, to calculate the probability that the user would type the unrecognized identifier given that the user intended to type an expected identifier.

Keystroke penalty matrix 380 may be used by processing device 320 to calculate keystroke penalties between entered identifiers and expected identifiers 350. For example, a character key on a keyboard that is located near a character from an expected identifier may be penalized less than character keys that are further away.

For expected identifiers 350, processing device 320 may use Bayes theorem, for example, to calculate a second probability that the user intended to type that expected identifier given both, the frequency of occurrence of that expected identifier and the previous string matching probability result. Once this second probability is determined for the expected identifiers 350, expected identifiers that have a probability higher than a threshold value may be displayed on output device 360. Alternatively, the identifiers having the highest one, two, three, etc. probabilities may be displayed on output device 360. If desired, embodiments may be configured to order identifiers based on their respective probabilities, e.g., rank ordering identifiers.

In another embodiment, if the probability is higher than a second threshold value, for an expected value, the suggested identifier may automatically replace the unrecognized identifier without additional interaction from the user. In another embodiment, the suggested identifier may automatically replace the unrecognized identifier if previously indicated by the user. In this case, the user may select the second threshold value to replace the unrecognized identifier or the user may specify that certain unrecognized identifiers are replaced by indicated identifiers.

In some embodiments, processing device 320 may detect alternative identifiers 390 and/or identifier patterns 395. Alternative identifiers 390 may be mapped to expected identifiers 350. When an alternate identifier from alternative identifiers 390 is detected a corresponding expected identifier from expected identifiers 350 may be identified. The identified expected identifier may be presented to a user for selection and/or modification. Identifier patterns 395 (e.g., incompatible programming language syntax or possible command mistake based on context) may be mapped to corresponding suggested identifier patterns (e.g., correct programming language syntax for the current programming language or a suggested command based on context). When an identifier pattern (e.g., i++) from identifier patterns 395 is detected a corresponding suggested identifier pattern from suggested identifier patterns may be identified. The suggested identifier pattern may be presented to a user for selection and/or modification.

In an embodiment, the list of expected identifiers may be different depending on context. For example, when an identifier is used on its own, the sources of global identifiers and local identifiers may be used. However, if, for example, the usage is "knownIdentifier unknownIdentifier," then the list of expected identifiers may be the subidentifiers of the knownIdentifier. The subidentifiers of the knownIdentifier may be stored in a separate data source. For example, processing device 320 may query an algorithm and/or database to determine the possible properties and/or members of knownIdentifer. On the other hand, if, for example, the usage is "knownIdentifier('unknownIdentifief')," processing device 320 may query an algorithm and/or database to determine if function knownIdentifier has registered a list of possible expected string inputs. Accordingly, the result of the algorithm and/or database queries may be used as expected identifiers.

In another example, if "unknownIdentifier.identifier" is entered, the unknownIdentifier may be matched as if the ".identifier" were not included. Once processing device 320 finds one or more possible suggestions, processing device 320 may then query an algorithm and/or database to determine the list of subidentifiers of the possible suggestions. The subidentifiers may be matched against the inputted ".identifier." If, for example, possible matches are discovered between a possible suggestion's subidentifer and ".identifier," the possible suggestion becomes more likely, and if there are no matches, the possible suggestion may become less likely or may be nullified.

Illustrative Processing

Figure 4:
FIG. 4 illustrates a portion of an example keystroke penalty matrix depicting mistyping penalties in an illustrative embodiment.

FIG. 4 illustrates a portion of example keystroke penalty matrix 400 for depicting mistyping penalties based on a QWERTY keyboard layout in an illustrative embodiment. Illustrative keystroke penalty matrix 400 depicts a reduced set of possible keys from, for example, a 128 by 128 matrix. Each value in the matrix may represent a mistyping penalty. The 128 values on each row and column may represent characters which may include characters needed to enter a known identifier, for example. Illustrative keystroke penalty matrix 400 depicts keys "Q-E," which may be a subset of all keys. A keystroke penalty matrix used in an illustrative embodiment may include a matrix for all possible keys or a reduced set. The keystroke penalty matrix 400 may depict how keystroke mistakes may be penalized. For example, keys that are nearby may be penalized less than keys that are further away.

The character entered or entered value 410 may be, for example, a column identifier. The character of an expected identifier or the character a user meant to type 420 may be, for example, a row identifier. According to example keystroke penalty matrix 400, for example, an expected identifier that requires an "e," mistyping "w" may incur a penalty of 2, while mistyping "Q" may incur a much higher penalty of 5. In this case, "Q" is uppercase and further away from "e" on a standard QWERTY keyboard and, therefore, is less likely to be typed by accident.

In another illustrative embodiment, for example, the string "pkot" will have less penalty than "pqot" when compared to the valid MATLAB® command "plot" because "k" is immediately to the left of "l" on a standard QWERTY keyboard and "q" is further away from "l." Various rules may be incorporated into the penalty matrix depending on the particular information processing system. For example, the penalty for mismatched case may be increased or decreased depending on the particular processing system 300.

In one illustrative embodiment, keystroke penalty matrix 400 may be used in combination with a string matching algorithm such as the Needleman-Wunsch algorithm or Smith-Waterman algorithm, for example. The combination of a string matching algorithm and keystroke penalty matrix 400 may be employed as discussed regarding 750 of FIG. 7.

In an illustrative embodiment, a key may refer to a key on a keyboard, where the keyboard may be input device 310. A keyboard may be, for example, alphabetic, numeric, and/or symbolic. A keyboard may be, for example, a QWERTY keyboard, a Dvorak keyboard, a French-language keyboard, a Spanish-language keyboard, a Korean-language keyboard, an Arabic-language keyboard, a Chinese-language keyboard, a numeric-only keyboard, etc. The keys on the keyboard may be representative of characters such as, but not limited to, letters, symbols, and/or sounds in one or more languages. A key may be representative of a symbol that is not tied to a language (e.g. a mathematical symbol, a paragraph symbol, etc.). Other input devices may be used in place of a keyboard to practice the invention.

Figure 5:
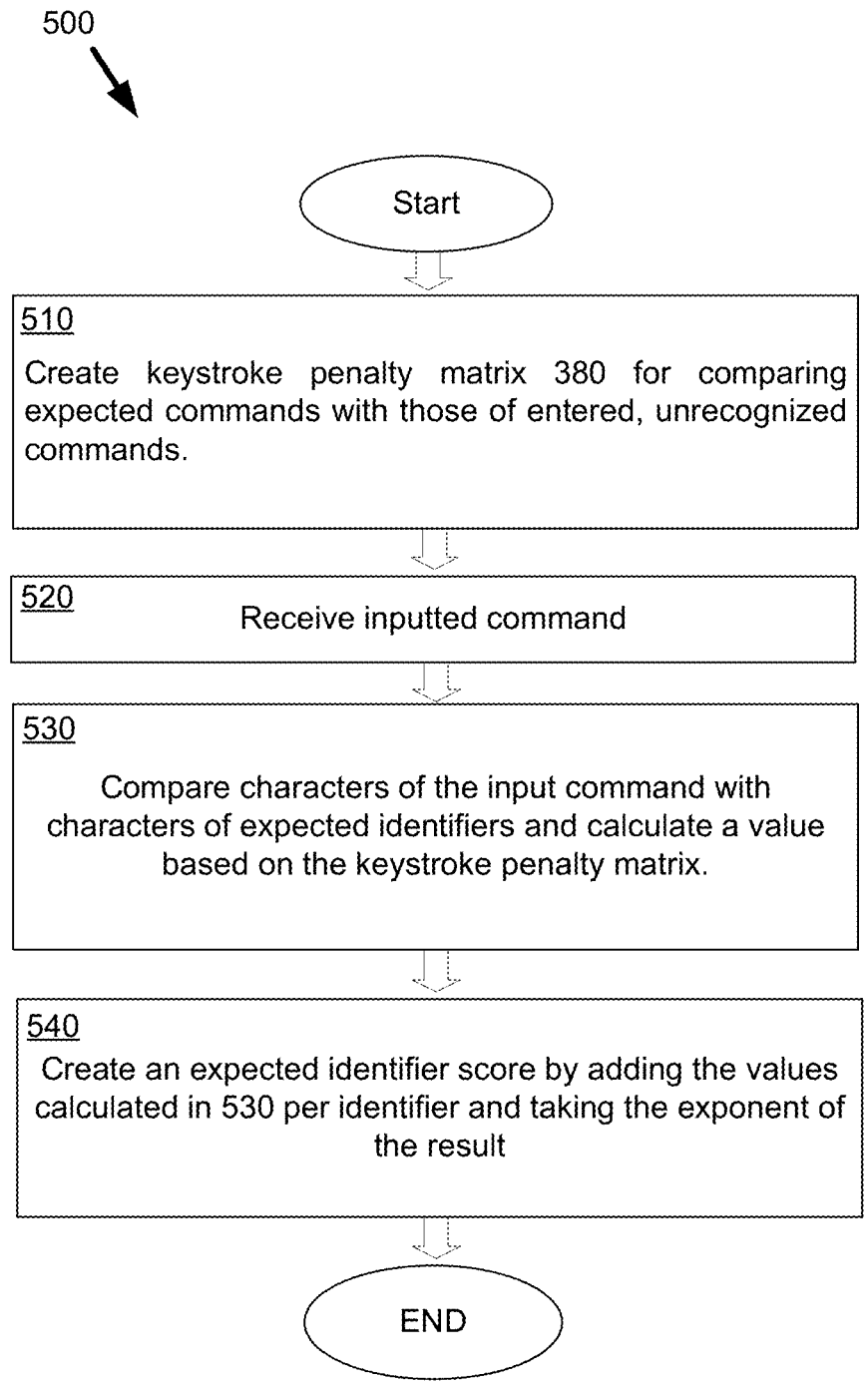
FIG. 5 illustrates an example flowchart describing processing of a penalty matrix performed by hardware in an illustrative embodiment.

FIG. 5 illustrates example flowchart 500 describing processing of keystroke penalty matrix 380 performed by hardware and/or software in an illustrative embodiment. The keystroke penalty matrix 380 may be visually represented as 400 in FIG. 4 and may be used in 750 of FIG. 7 (discussed below).

In 510, keystroke penalty matrix 380 may be created for comparing expected identifiers with those of entered, unrecognized commands. In FIG. 4, illustrative keystroke penalty matrix 400 illustrates a portion of an example keystroke penalty matrix 380.

Keystroke penalty matrix 380 may assign the log of a probability that the character is, for example, a match (e.g., the characters are the same), a case miss (e.g., the characters are the same except case (e.g., "a" to "A")), a close miss (e.g., where the characters are one key away in terms of physical distance on a keyboard (e.g., "g" to "h" on a QWERTY layout)), a miss (e.g., where the characters are over one key away in terms of physical distance on a keyboard (e.g., "a" to "p" on a QWERTY layout)), a gap open (e.g., where a non-matching character was inadvertently entered into the sequence), and/or a gap extend (e.g., where a non-matching character was inadvertently entered into the sequence after a gap open). In addition to close miss and case miss, close-case miss (e.g., the combination of close miss and case miss) may also be calculated.

Keystroke penalty matrix 380 may be created based on the keyboard layout of the system (e.g., designated by the operating system) or as designated by the user. Varying keyboard layouts may include, for example, QWERTY, Dvorak, French, German, Spanish, Japanese, Chinese, Arabic, Russian, etc.

In an embodiment, the following examples assume that the expected identifier is "Hicklin." If the entered command was "Hicklin," then there was a match. If the entered command was "hicklin," then a case miss penalty may be charged (e.g., "h" not "H"). If the entered command was "Hickoin," then a close miss penalty may be charged (e.g., "o" not "l"). If the entered command was "Hicxlin," then a miss penalty may be charged (e.g., "x" not "l"). If the entered command was "HicXklin," then a gap open penalty may be charged (e.g., extra character "X"). If the command was "HicXYZklin," then there may be one gap open (e.g., extra character "X") and two gap extend penalties (e.g., extra characters "Y" and "Z"). If the entered command was "Hiclin," then there may be a gap penalty for the missing "k." If the entered command was "jicklin," then the penalty may be the sum of a close miss and a case miss for (1) a near miss of "j" for the missing "H" and (2) a lowercase where an uppercase was expected.

In an embodiment, example probabilities with a logarithmic value applied may include:
Match=log 10(0.969);
Case Miss=log 10(0.010);
Close Miss=log 10(0.010/6);
Miss=log 10(0.001/120);
Gap Open=log 10(0.005);
Gap Extend=log 10(0.005);
Close-Case Miss=log 10(0.010/6)+log 10(0.010);
Although keystroke penalty matrix 380 is referred to as a "matrix," other data structures may be used.

In 520, an inputted command may be received. The input command may be received by input device 310. The inputted command may be inputted directly by a user or may inputted by other means. For example, an input may be as an optical character recognition (OCR) from a document or file.

In 530, the characters of the entered command may be compared with the characters of expected identifiers 350. A penalty value, as described above, may be calculated based on the keystroke penalty matrix 380 for the characters of expected identifiers 350, alternative identifiers 390 and identifier patterns 395 (e.g., collectively known commands). Known commands, when compared character-to-character with the entered command, may be scored based on, for example, whether the two characters are a match, different cases, a close miss, a miss, a close-case miss, and/or whether the spacing is incorrect.

In 540, a score may be calculated for expected identifiers 350 by adding the values calculated in 530 and then taking the exponent of the addition result.

Figure 6:
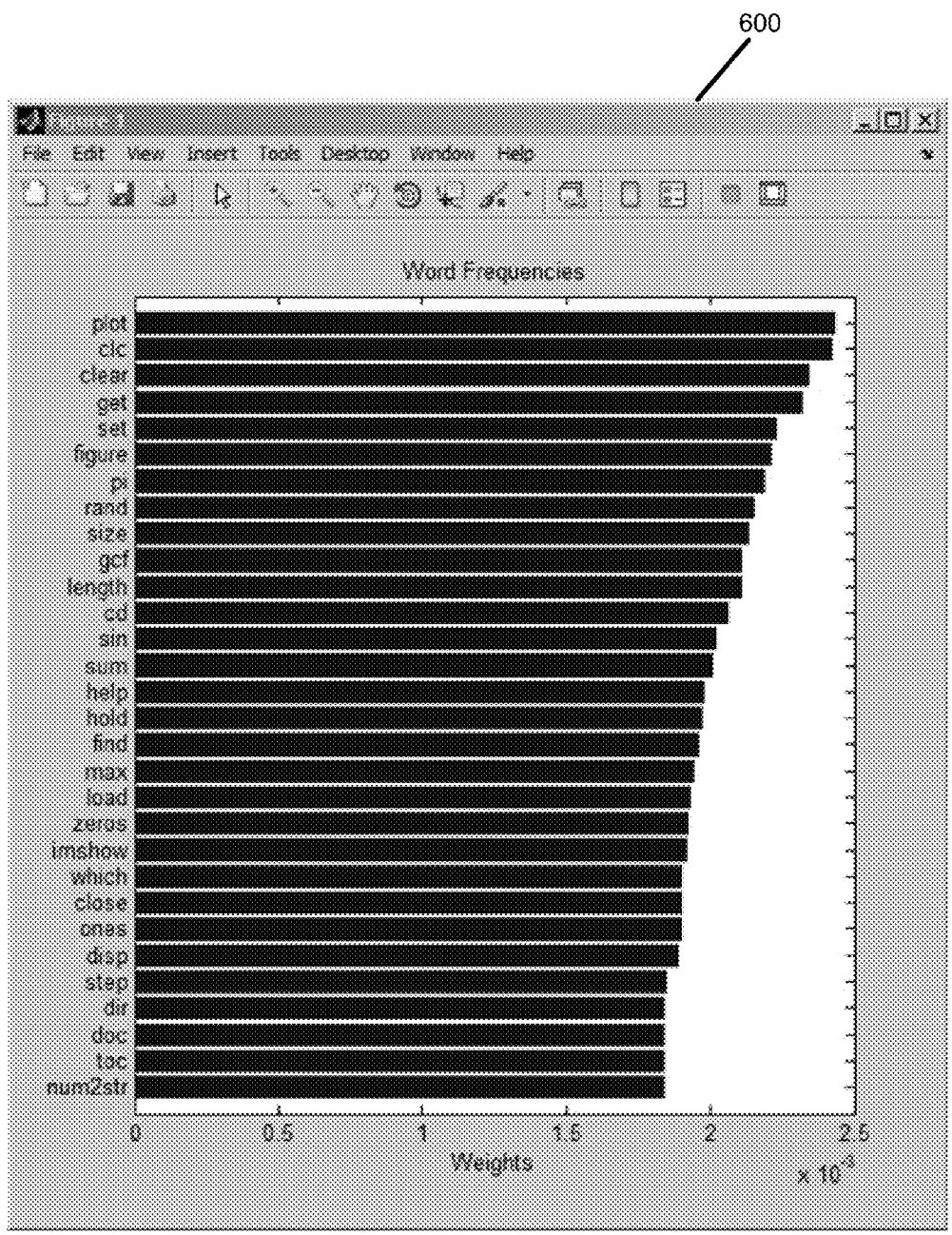
FIG. 6 illustrates a portion of an identifier frequency graph depicting the probability of occurrence of an example subset of identifiers in an illustrative embodiment.

FIG. 6 illustrates a portion of an example identifier frequency graph 600 depicting the probability of occurrence of a subset of identifiers in an illustrative embodiment. Identifier frequency graph 600 depicts a reduced set of expected identifiers from an illustrative embodiment. The full set of identifiers and corresponding probabilities of occurrence may vary considerably depending on the processing system used and context. Identifier frequency graph 600 depicts that the identifier "plot" occurring as an input string is significantly higher than, for example, the identifier "num2str." Identifier frequency graph 600 is an illustrative sample visual depiction of a subset of expected identifiers 350 of FIG. 3 and created in 720 of FIG. 7.

In one embodiment, a collection of usage statistics may provide a learning aspect which allows an illustrative embodiment to customize itself to particular usage characteristics. Collection of statistics and assignment of the recalculated frequency of occurrence (e.g., identifier frequency graph 600) may occur periodically (e.g., every minute, hour, week, month, etc.) or may occur in real-time and/or continuously. This feature may provide specific customization where different users may use various commands with more or less frequency. Commands that are used frequently by others may then be given a higher probability of occurrence and, therefore, may be more likely to be presented as a user-selectable suggestion.

Figure 7:
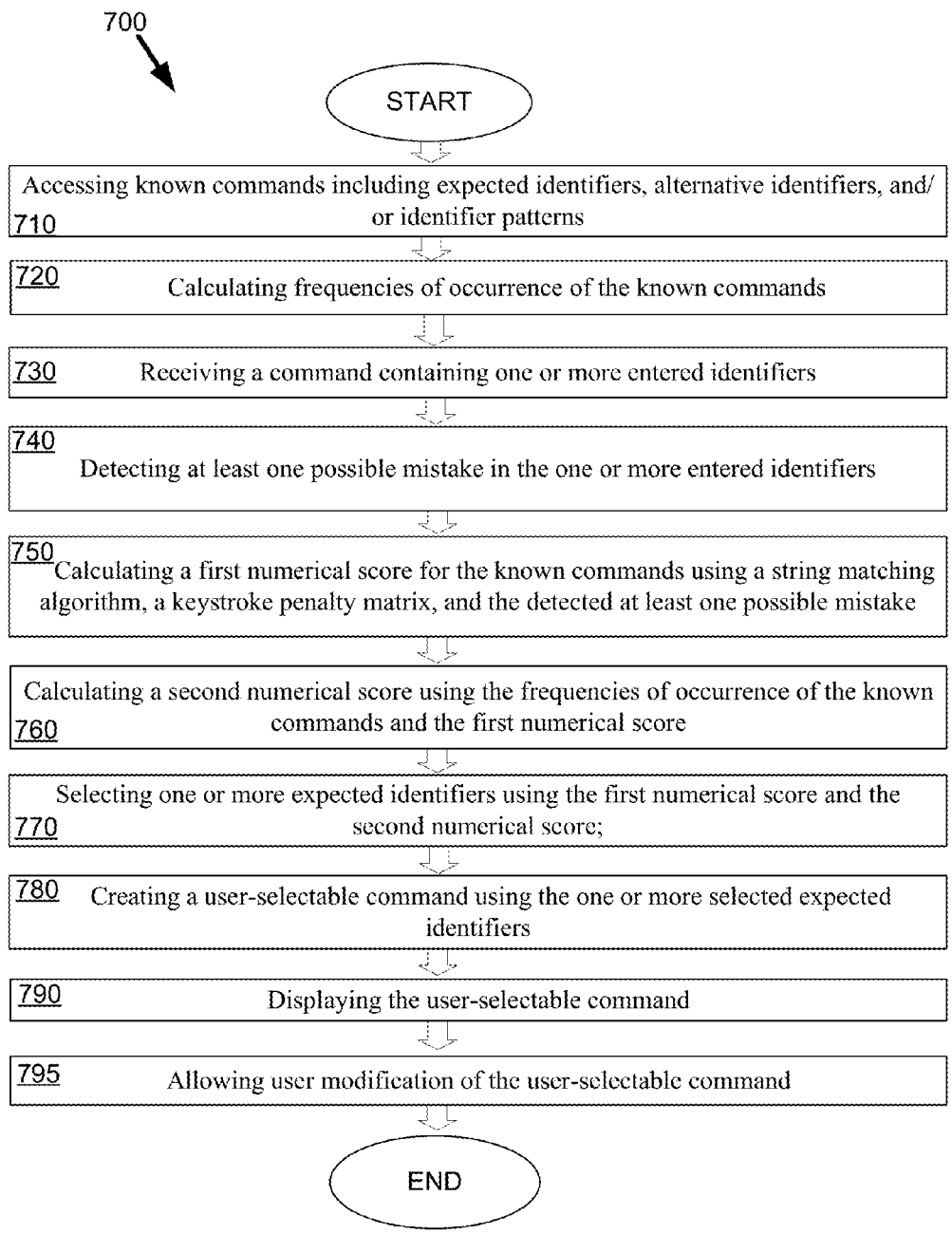
FIG. 7 illustrates an example flowchart describing processing performed by hardware in an illustrative embodiment.

FIG. 7 illustrates example flowchart 700 describing processing performed by hardware in an illustrative embodiment. In 710, known commands may be accessed. The known commands may include, for example, expected identifiers 350, alternative identifiers 390, and/or identifier patterns 395.

In 720, a frequency of occurrence (such as identifier frequency graph 600 in FIG. 6) may be calculated for the known commands. The known commands and the associated frequency of occurrences of the identifiers may be called a prior probability distribution or "the prior."

In 730, a command may be received that contains one or more entered identifiers. The command may be entered in by a user using input device 360 or may be received through other inputs such as OCR.

In 740, at least one possible mistake may be detected in the one or more entered identifiers.

In 750, a first numerical score or the known commands may be calculated using a string matching algorithm, a keystroke penalty matrix 380, and the detected at least one possible mistake. The string matching algorithm may be based on, for example, the Needleman-Wunsch algorithm or Smith-Waterman algorithms. Additionally, the keystroke penalty matrix 380 may be created in block 510 of FIG. 5, and may be visually represented as sample keystroke penalty matrix 400 in FIG. 4.

In 760, a second numerical score may be calculated using the frequencies of occurrence of the known commands (e.g., Bayes algorithm) and the first numerical score. For example, sample frequencies of occurrence may be visualized as identifier frequency graph in FIG. 6.

In 770, one or more expected identifiers may be selected using the first numerical score and the second numerical score.

In 780, user-selectable command(s) may be created using the one or more selected expected identifiers. In one embodiment, the number of displayed suggested user-selectable commands may vary depending on the determined probability that what was inputted was intended to be the user-selectable command. For example, if the probability was 90% that what was entered was intended to be the found identifier(s) from 770 then only one user-selectable command may be displayed. However, if, for example, two identifiers from 770 each had a 40% probability that they were intended to be what was inputted in 730, then both values may be displayed. Similarly, for example, if three found identifier(s) from 770 each had a 30% probability that they were intended to be to be what was inputted in 730 then all three values may be displayed as user selectable commands. Identifiers from 770 with a low probability (e.g., but not limited to, less than 20%) may not be of value to the user and may cause unnecessary user confusion and therefore, may not be displayed. Alternatively, the identifiers from 770 having the highest one, two, three, etc. probabilities may be displayed on output device 360 as user-selectable commands. In other embodiments, the identifier with the highest probability may be automatically selected and entered into the system for calculation and/or implementation and no user-selectable command may be displayed to the user.

In 790, the user-selectable command(s) may be displayed.

In 795, user modification of the user-selectable command may be allowed.

Accordingly, user-selected command from 780 or user-modified command from 795 may then be entered into the system for calculation.

Example Software Implementation

FIGS. 8A and 8B illustrate illustrative software code 810 (FIG. 8A) and 820 (FIG. 8B) that may implement an illustrative embodiment of the invention. Example software code listing 820 is a continuation from software code listing 810. In an illustrative embodiment, function call 830 may be used for 510 to create keystroke penalty matrix 380. The variable typedString 840 may be the inputted command as in 520. Blocks 530 and 540 may be shown in loop 850.

Figure 10:
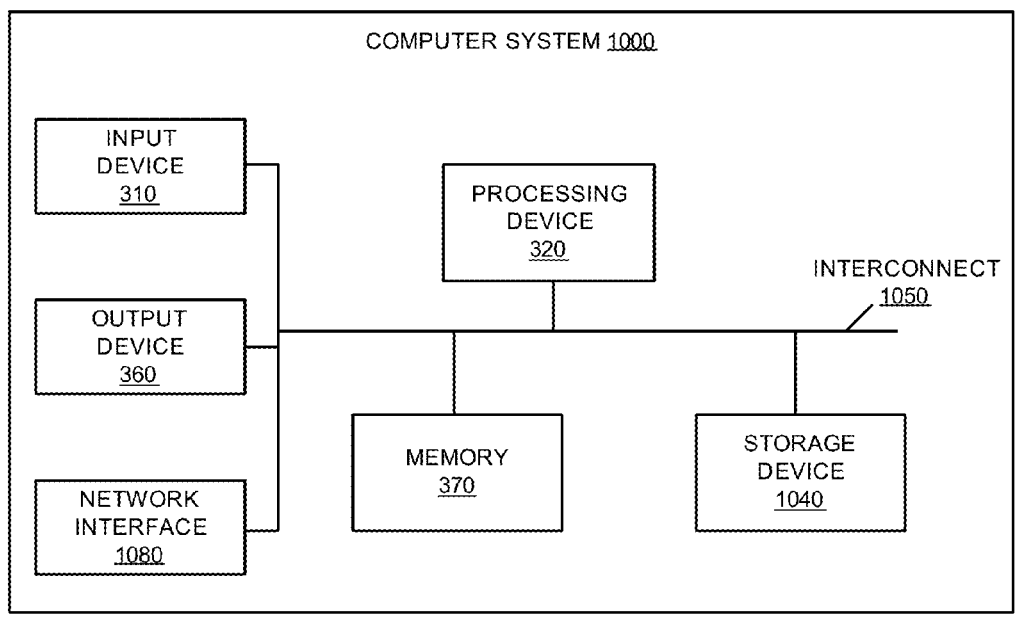
FIG. 10 illustrates an example of a computer system that may be configured to practice an illustrative embodiment.

Example software code 810 and 820 may be stored in memory 370 and/or storage device 1040 (FIG. 10). Example software code 810 and 820 are written in the MATLAB Programming®. language, but similar implementations may be written in other types of programming languages such as, but not limited to, C/C++, Fortran, Forth, Ada, Pascal, JavaScript, Python, C#, Java, Visual Basic, etc.

Example Distributed System

Figure 9:
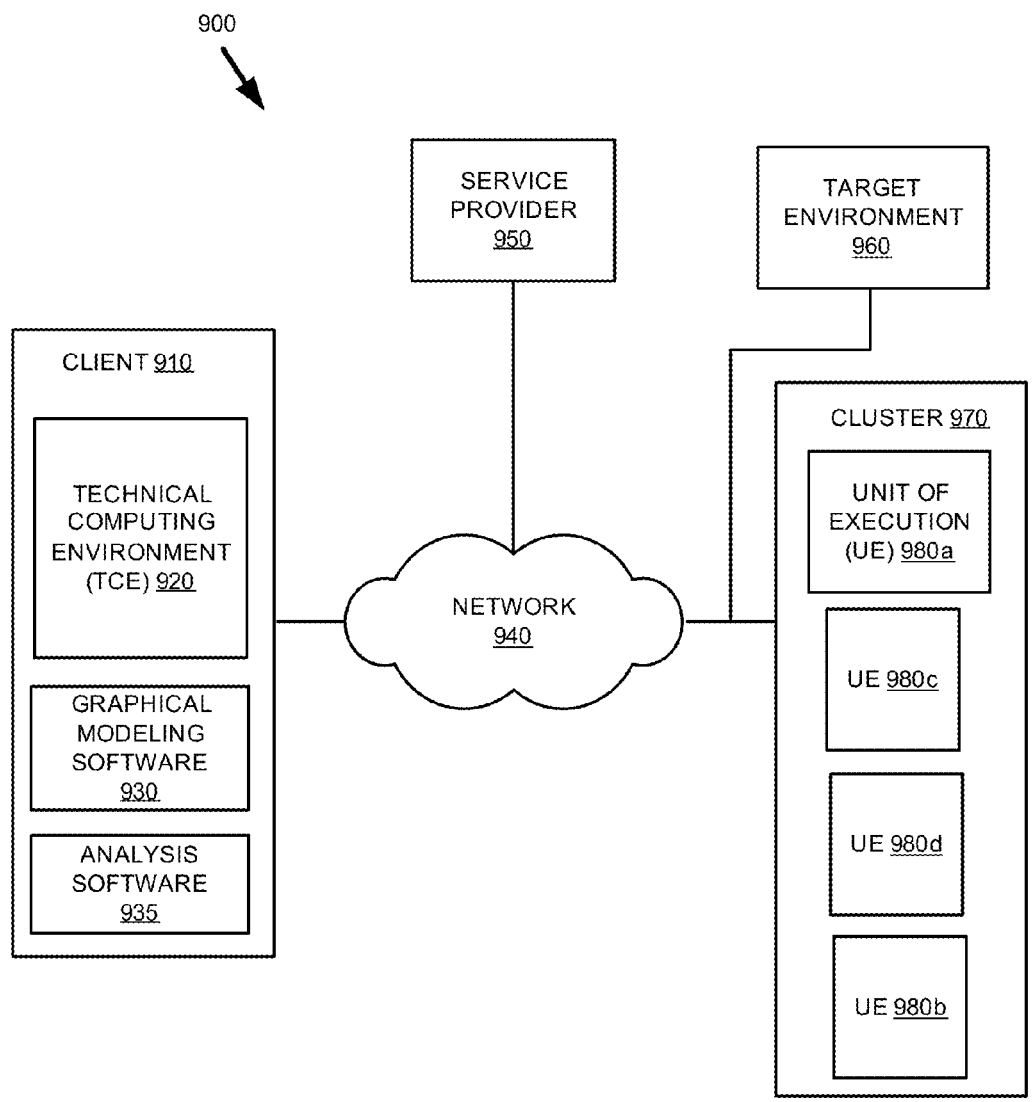
FIG. 9 illustrates a distributed environment that may be configured to practice an illustrative embodiment.

FIG. 9 illustrates distributed environment 900 that may be configured to practice an illustrative embodiment. Referring to FIG. 9, environment 900 may include a client 910, network 940, service provider 950, target environment 960 and cluster 970. Note that the distributed environment illustrated in FIG. 9 is just one example of a distributed environment that may be used. Other distributed environments may include additional devices, fewer devices, or devices in arrangements that differ from the arrangement of environment 900. For example, distributed environment 900 can be implemented as a computing cloud if desired.

Client 910 may include a device capable of sending and/or receiving information (e.g., data) to and/or from another device, such as target environment 960. Information may include any type of machine-readable information having substantially any format that may be adapted for use, e.g., in one or more networks and/or with one or more devices. The information may include digital information and/or analog information. The information may further be packetized and/or non-packetized. In an embodiment, client 910 may download data and/or code via network 940. For example, client 910 can download code for suggesting correct identifiers consistent with aspects of the invention.

Client 910 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an illustrative embodiment, client 910 may include a technical computing environment (TCE) 920, graphical modeling software 930 and analysis software 935. TCE 920 may include a graphical block diagram environment that may be used to execute models and manipulate the models in accordance with techniques described herein. In other illustrative embodiments, client 910 may include other components, applications, etc. Illustrative embodiments of TCE 920 may contain computer-executable instructions (e.g., code) and data that are configured to implement the TCE. The instructions may include instructions configured to implement graphical modeling software 920 and/or graphical analysis software 935. An example embodiment of the invention may be implemented in a TCE 910.

Modeling software 930 and analysis software 935 may be graphical, textual or a hybrid that includes both textual and graphical capabilities/features. Modeling software 930 may include computer-executable instructions that allow, e.g., a user to build and/or execute a model. For example, modeling software 930 may allow a user to build and execute a time-based model, a state-based model, an event-based model, a dataflow-based model, etc. An example embodiment of the invention may be implemented as part of modeling software 930.

Analysis software 935 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 935 may include the Simulink® Design Verifier software which is available from The MathWorks, Inc. An example embodiment of the invention may be implemented as part of analysis software 935.

Network 940 may include any network capable of exchanging information between entities associated with the network, including, for example, client 910, service provider 950, target environment 960 and cluster 970. Exchanged information may include, for example, packet data and/or non-packet data. Implementations of network 940 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 940 may include various network devices, such as, for example, routers, switches, firewalls, servers, etc. Portions of network 940 may be wired (e.g., using wired conductors, optical fibers, etc.) and/or wireless (e.g., free-space optical (FSO), radio frequency (RF), acoustic transmission paths, etc.). Portions of network 940 may include a substantially open public network, such as the Internet. Portions of network 940 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 950 may include code (e.g., software), logic (e.g., hardware or a combination of hardware and software), etc., that makes a service available to another device in distributed environment 900. Service provider 950 may include a server operated by an entity (e.g., an individual, a corporation, an educational institution, a government agency, etc.) that provides one or more services to a destination, such as client 910. The services may include software containing computer-executable instructions that may be executed, in whole or in part, by a destination, by service provider 950 on behalf of the destination, or some combination thereof. An example embodiment of the invention may be implemented as part of service provider 950.

For example, in an illustrative embodiment, service provider 950 may provide one or more subscription-based services to various customers via network 940. These services may be accessed by the customer (e.g., via client 910). Service provider 950 may limit access to certain services based on, e.g., a customer service agreement between the customer and service provider 950. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 960 may include a device that receives information from client 910, service provider 950, or cluster 970. For example, target environment 960 may receive executable code from client 910, where the executable code allows target environment to perform an operation when the code is executed. Client 910 may have generated the executable code using TCE 920, graphical modeling software 930, and/or a code generator (not shown in FIG. 9).

Cluster 970 may include a number of processing resources that perform processing on behalf of another device, such as client 910, service provider 950 and/or target environment 960. Cluster 970 may include logic that manages and/or coordinates the operation of multiple processing resources. For example, cluster 970 may send data to and/or receive results from these processing resources. In an illustrative embodiment, cluster 970 may include units of execution (UEs) 980*a, b, c*, and *d* (collectively UEs 980) that may perform processing on behalf of client 910 and/or another device, such as service provider 950. An example embodiment of the invention may be implemented on one or more UEs 980.

UEs 980 may include hardware, software, or hybrid logic that perform processing operations on behalf of TCE 920. For example, in an illustrative embodiment UEs 980 may parallel process portions of a graphical model created by user of client 910. This parallel processing may include performing analysis on the model, parsing the model into portions, and/or aggregating results from respective UEs 980 into a single result for display to a user at client 910. UEs 980 may reside on a single device or chip or on multiple devices or chips. For example, UEs 980 may be implemented in a single application specific integrated circuit (ASIC) or in multiple ASICs. Likewise, UEs 980 can be implemented in a single computer system using virtualization techniques. Other examples of UEs 980 may include field programmable gate arrays (FPGAs), complex programmable logic devices (CPLDs), application specific instruction-set processors (ASIPs), microprocessors, etc.

TCE 920 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, TCE 920 may include a dynamically typed language that can be used to express problems and/or solutions in mathematical notations familiar to those of skill in the relevant arts. For example, TCE 920 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

TCE 920 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 920 may further provide mathematical functions and/or graphical tools (e.g., for creating plots, surfaces, images, volumetric representations, etc.). In one implementation, TCE 920 may provide these functions and/or tools using toolboxes (e.g., toolboxes for signal processing, image processing, data plotting, parallel processing, optimization, etc.). In another implementation, TCE 920 may provide these functions as block sets (e.g., an optimization block set). In still another implementation, TCE 920 may provide these functions in another way, such as via a library, etc. TCE 920 may be implemented as a text based environment, a graphically based environment, or another type of environment, such as a hybrid environment that is both text and graphically based.

As an example, example software code 810 and 820 may be complied and processed by processing device 320 and implemented in TCE 920.

Illustrative Computing Architecture Example System

FIG. 10 illustrates an example of a computer system 1000 that may be configured to practice an illustrative embodiment of the invention. For example, computer system 1000 may be used to implement client 910, service provider 950, target environment 960, etc. Computer system 1000 may include processing device 320, memory 370, storage device 1040, input device 310, output device 360, interconnect 1050 and network interface 1080. For example, output device 360 may include logic configured to output information from computer system 1000. Processing device 320, memory 370, input device 310, and output device 360 may be configured and implemented as discussed in FIG. 3.

Storage device 1040 may include a magnetic disk and/or optical disk and its corresponding drive for storing information and/or instructions.

Interconnect 1050 may include logic that operatively couples components of computer system 1000 together. For example, interconnect 1050 may allow components to communicate with each other, may provide power to components of computer system 1000, etc. In an illustrative embodiment of computer system 1000, interconnect 1050 may be implemented as a bus.

Network interface 1080 may include logic configured to interface computer system 1000 with a network, e.g., network 940, and may enable computer system 1000 to exchange information with other entities connected to the network, such as, for example, service provider 950, target environment 960 and cluster 970. Network interface 1080 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1000 to any type of network.

It should be noted that illustrative embodiments may be implemented using some combination of hardware and/or software. It should be further noted that a computer-readable medium that includes computer-executable instructions for execution in one or more processors may be configured to store illustrative embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an illustrative embodiment. The computer-readable medium may include tangible non-transitory storage media that may store one or more computer-executable instructions executable by, for example, processing device 320.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processing devices 320. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an illustrative embodiment, a software unit of execution may perform and/or participate in substantially any type of parallel programming using one or more hardware units of execution. Illustrative embodiments of a software unit of execution may support one or more threads and/or processes when performing processing operations.

Alternative Illustrative Embodiments

An alternative illustrative embodiment may implement TCE 920 using one or more text-based products. For example, a text-based TCE 920, may be implemented using products such as, but not limited to, MATLAB®; Octave; Python; R; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Other illustrative embodiments may implement TCE 920 in a graphically-based TCE 920 using products such as, but not limited to, Simulink®, Stateflow®, SimEvents™, etc., by The MathWorks, Inc.; VisSim by Visual Solutions; LabView™ by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Another alternative illustrative embodiment may be implemented in a language that is compatible with a product that includes TCE 920, such as one or more of the above identified text-based or graphically-based TCE's 920. For example, MATLAB® (which is an example of a text-based TCE 920) may use a first command to represent an array of data and a second command to transpose the array. Another product, that may or may not include TCE 920, may be MATLAB®-compatible and may be able to use the array command, the array transpose command, or other MATLAB® commands. For example, the other product may use the MATLAB® commands to suggest proper identifiers when an unrecognized identifier is presented.

Yet another alternative illustrative embodiment may be implemented in a hybrid TCE 920 that combines features of a text-based and graphically-based TCE 920. In one implementation, one TCE 920 may operate on top of the other TCE 920. For example, a text-based TCE 920 (e.g., MATLAB®) may operate as a foundation and a graphically-based TCE 920 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that implement one or more algorithms to identify and display the most likely intended identifier(s) and/or suggest alternative syntax for inputted identifiers. A first algorithm may use, for example, a string matching algorithm combined with a keystroke penalty matrix to determine the probability for each identifier of a user typing the unrecognized identifier or series of identifiers when they intended to type the identifier from a list of expected identifiers and/or a list of recognized patterns of identifiers. A second algorithm may use a form of Bayes' theorem, for example, with the probability of occurrence for each identifier and the results of the first algorithm to further determine the probability of what the user intended to type. The highest results may be transferred and/or displayed to the user for selection or automatically inserted if the probability is high enough.

Another illustrative embodiment may allow a user to modify the suggested identifier prior to execution of the suggested identifier.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 7 and 5, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 3, 9, and 10. depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. A method, comprising:
   receiving a command, the command comprising:
     a first name,
     a second name, and
     a dot operator, the dot operator being between the first name and the second name,
     the receiving performed using one or more computing devices;
   detecting a possible mistake in the second name,
     the detecting performed using one or more computing devices;
   accessing a set of known identifiers, the set of known identifiers including expected identifiers,
     the accessing performed using the one or more computing devices;
   calculating a first numerical score for the known identifiers using a keyboard penalty matrix and based on the possible mistake detected in the second name and the known identifiers,
     the calculating the first numerical score performed using the one or more computing devices;
   calculating a second numerical score using frequencies of occurrence of the known identifiers and the calculated first numerical score,
     the calculating the second numerical score performed using the one or more computing devices; and
   selecting one or more expected identifiers for the second name,
     the selecting being based on the first numerical score and the second numerical score, and
     the selecting performed using the one or more computing devices.

2. The method of claim 1, where the second name is located to the right of the first name on a command line or in a software code listing.

3. The method of claim 2, where the first name is associated with a class and the second name is associated with a method, a property, or an enumerated value.

4. The method of claim 2, where the first name is associated with an instance and the second name is associated with a method or a property.

5. The method of claim 2, where the first name is associated with a package and the second name is associated with a class or a function.

6. The method of claim 2, where the first name is associated with a first package and the second name is associated with a second package.

7. The method of claim 2, where the first name is associated with a struct instance and the second name is associated with a field.

8. The method of claim 2, wherein the second name is within scope of the first name.

9. The method of claim 1, further comprising identifying the set of known identifiers based on the first name.

10. One or more non-transitory computer-readable storage media storing instructions, the instructions comprising:
one or more instructions that, when executed by one or more processors, cause the one or more processors to:
receive a command, the command comprising:
a first name,
a second name, and
a dot operator, the dot operator being between the first name and the second name;
detect a possible mistake in the second name;
access a set of known identifiers, the set of known identifiers including expected identifiers;
calculate a first numerical score for the known identifiers using a keyboard penalty matrix and based on the possible mistake detected in the second name and the known identifiers;
calculate a second numerical score using frequencies of occurrence of the known identifiers and the calculated first numerical score; and
select one or more expected identifiers for the second name, the selecting being based on the first numerical score and the second numerical score.

11. The one or more computer-readable storage media of claim 10, where the first name is located to the right of the second name on a command line or in a software code listing.

12. The one or more computer-readable storage media of claim 11, where the second name is associated with a class and the first name is associated with a method, a property, or an enumerated value.

13. The one or more computer-readable storage media of claim 11, where the second name is associated with an instance and the first name is associated with a method or a property.

14. The one or more computer-readable storage media of claim 11, where the second name is associated with a package and the first name is associated with a class or a function.

15. The one or more computer-readable storage media of claim 11, where the second name is associated with a first package and the first name is associated with a second package.

16. The one or more computer-readable storage media of claim 11, where the second name is associated with a struct instance and the first name is associated with a field.

17. The one or more computer-readable storage media of claim 10, further comprising instructions to identify the set of known identifiers based on the first name.

18. The one or more computer-readable storage media of claim 11, wherein the first name is within scope of the second name.

19. The one or more computer-readable storage media of claim 10, where the second name is located to the right of the first name on a command line or in a software code listing and the second name is within scope of the first name.

20. A device, comprising:
a processor to execute machine-readable instructions, the instructions when executed causing the processor to:
receive a command, the command comprising:
a first name,
a second name, and
a dot operator, the dot operator being between the first name and the second name;
detect a possible mistake in the second name;
access a set of known identifiers, the set of known identifiers including expected identifiers;
calculate a first numerical score for the known identifiers using a keyboard penalty matrix and based on the possible mistake detected in the second name and the known identifiers; and
select one or more expected identifiers for the second name, the selecting being based on the first numerical score.

21. The device of claim 20, where the second name is located to the left of the first name on a command line or in a software code listing.

22. The device of claim 21, wherein the first name is within scope of the second name.

23. The device of claim 20, further comprising instructions to identify the set of known identifiers based on the first name.

24. The device of claim 20, where the second name is located to the right of the first name on a command line or in a software code listing and the second name is within scope of the first name.

* * * * *